UNITED STATES PATENT OFFICE.

JOHN F. WIXFORD, OF ST. LOUIS, MISSOURI.

PROCESS OF PURIFYING WATER.

No. 807,412.  Specification of Letters Patent.  Patented Dec. 12, 1905.

Original application filed September 23, 1904, Serial No. 225,611. Divided and this application filed June 26, 1905. Serial No. 266,949.

*To all whom it may concern:*

Be it known that I, JOHN F. WIXFORD, a citizen of the United States, and a resident of the city of St. Louis, State of Missouri, have invented a new and useful Process of Purifying Water, of which the following is a specification.

My invention relates to the purification of water, and has for its principal objects to eliminate dissolved and suspended matter without leaving new matter in the clarified water; also, to utilize portions of the matter contained in the natural water in aid of the reagents added thereto; also, to shorten the time required for sedimentation; also, to eliminate the danger of leaving a discoloring agent in the clarified water; also, to attain other advantages hereinafter specified.

Many natural waters, such as the Missouri river water, contain a considerable proportion of dissolved bicarbonates of lime and magnesia and soluble silicates, as well as large quantities of mineral and organic matter, in suspension, and my process is especially adapted for the treatment of such waters.

It consists in the process hereinafter described and claimed. This process can be carried out with various fluorids; but for the sake of simplicity of description I will first describe how it is practiced with ferrous fluorid.

The matter of the present application is divided out of an application, Serial No. 225,611, filed by me September 23, 1904.

Ferrous fluorid is dissolved in a small continuously-flowing stream of clear water, which is directed into a stream of the water to be treated. The ferrous fluorid thus dissolved reacts upon the bicarbonates dissolved in the raw water, changing them to the corresponding calcium and magnesium fluorids and forming ferrous bicarbonate. At this stage there is no marked coagulation; but the water is in a fit condition to yield a strong, heavy, and very efficient coagulant by the reaction of hydrate of lime thereon. Hydrate of lime (in the form either of milk of lime or, preferably, of lime-water) is next thoroughly mixed with the water. The first quantities of lime added to the water react almost entirely with the free carbonic acid ($CO_2$) and with the ferrous bicarbonate resulting from the fluorid reaction, and after these are satisfied the additional lime continues to react upon other matter in the water. The probable reactions are as follows: All of the free carbonic acid is rapidly converted into insoluble normal calcium carbonate, and all of the ferrous bicarbonate resulting from the fluorid reaction is rapidly converted into ferrous hydrate and insoluble calcium carbonate. Most of the ferrous hydrate oxidizes to insoluble ferric hydrate. The remaining calcium bicarbonate is changed into insoluble normal calcium carbonate, bicarbonate of magnesia is changed to insoluble magnesium carbonate and insoluble magnesium hydrate, and some of the silicates in the water are changed to calcium silicate and probably some other silicate. On account of the last-mentioned reactions, with the bicarbonates and silicates occurring principally after the free carbonic acid and the ferrous bicarbonate resulting from the fluorid reactions have been completely satisfied, the amount of carbonates and silicates affected will be proportional to the amount of lime in excess of that needed to satisfy the free carbonic acid and the ferrous bicarbonate. Usually it is unnecessary for clarification purposes to react upon all of the carbonates and silicates in the water, and it is not usually desirable to entirely eliminate them from drinking-waters. The foregoing reactions are accompanied with reactions of the lime upon other matter, such as sulfate of magnesium, clay, or organic matter, if any is present in the water. The particles of clay are exceedingly fine, and the action of the lime thereon causes the fine particles to flocculate and to agglomerate with the precipitates.

As stated above, the reaction of the lime upon the ferrous bicarbonate resulting from the fluorid reaction produces ferrous hydrate, which tends to change rapidly to ferric hydrate. Both of these hydrates are strong heavy coagulants and form rapidly, whereas the reactions of the lime upon the other matter in the water, especially upon the carbonates, are appreciably slower. As the function of the coagulant is to constitute a nucleus upon which the late-forming precipitates may agglomerate and to increase the specific gravity of the agglomerated mass, it is important that the metal precipitate or coagulant shall be kept in a state of suspension until the slower reactions shall have been completed. For this purpose the water is kept in a state of agitation for a period of time sufficient to substantially complete such reactions, after which the water is permitted to become quiet to facilitate sedimentation. Under ordinary conditions the best results are produced when sedimentation is prevented for a period of several minutes (from three to twenty minutes) after the lime is added to the water. In practice the lime is preferably added at the delivery-well or other point in the system where the water is in rapid motion, and the water is thence conducted through one or more conduits into the sedimentation-basins, the length of the conduit being sufficient to require about five or ten minutes for the passage of the water from the point where the lime is admitted to the sedimentation-tank. When the lime is used in the form of milk of lime, it is preferable to divide the stream of raw water and treat the larger division thereof with ferrous fluorid and the smaller with the milk of lime. In this way the lime is dissolved by the time the water reaches the point where the two divisions of the stream are reunited, so that its full potential value is more nearly realized.

In order to prevent rapid horizontal currents in the sedimentation-tank, the water-conduit terminates in one or more upturned pipes located in the sedimentation-basin below the water-level. By this arrangement the water is caused to well up from below, carrying with it the heavy coagulant, as well as the lighter precipitates, and facilitating their proper agglomeration. Baffle-walls may be arranged to prevent any considerable currents in the sedimentation-basin.

For a description of a system specially adapted for the use of the present process reference is hereby made to my copending application for patent, Serial No. 258,228, filed May 1, 1905.

It is possible to get good results by introducing the reagents simultaneously or even by introducing the lime first; but by introducing the fluorid first certain results are attained that cannot be attained otherwise. For instance, to secure the full advantage of the specific action of the metal base on organic matter the fluorid should be introduced first. So, too, in order to render the precipitate stainless the fluorid should be introduced first. In this latter case the metal hydrate, which constitutes the nucleus around which the other precipitates agglomerate, is thoroughly coated with minute whitish crystals, so that if for lack of sufficient sedimentation or by accident such sediment should be delivered into the distribution system it would not stain the fixtures that it comes in contact with.

It is to be noted that one product of the reaction of the lime or lime carbonates upon any of the soluble fluorids is fluorid of calcium. As fluorid of calcium is an insoluble compound and is precipitated in the sedimentation-tank, it is obvious that all of the reagents added to the water in the process above described are entirely eliminated therefrom, as well as the ingredients of the natural water with which they react.

As one of the principal functions of the fluorid is to furnish a coagulant for the lighter and later-forming precipitates and to increase the specific gravity of the agglomerated particles, it is obvious that the amount of such fluorid admits of considerable variation. The more metallic fluorid is used the more rapid will be the sedimentation, but the greater will be the quantity of lime and the cost of reagents. Under ordinary conditions one grain of anhydrous ferrous fluorid (or its equivalent in crystals) per gallon of water will give satisfactory results with Mississippi river water at St. Louis. As all of the products of reaction are eliminated from the clarified water, there is no danger of adding too much of the fluorid, and economical conditions alone may control the quantity to be used. The quantity of anhydrous fluorid (or its equivalent in crystals) may vary from one quarter of a grain per gallon to two grains per gallon, or even more.

The amount of lime that can be usefully employed in this process for clarifying and elimination purposes is determined by two factors—first, the amount of such matter in the natural water (whether in solution or in suspension) as reacts with lime, and, second, the amount of fluorid added to the water. These factors are obvious when the lime is added before the fluorids, in which case the matter in the water will first become satisfied with lime, after which the subsequently-added fluorid remains to be satisfied. The result is substantially the same, however, when the fluorid is added first, for while the fluorid first reacts with the carbonate of lime in the raw water, and thereby eliminates such lime from the water, the same reaction produces a bicarbonate of the metallic base which requires at least as much lime as the amount eliminated as fluorid. Any excess of lime above the total of these two factors will result in making the clarified water caustically alkaline, which condition is usually undesirable. On the other hand, when the fluorid is added first and is followed by an amount of lime less than the total of these two factors the clarified water will retain a portion of the salts naturally belonging thereto. As it is usually desirable to retain a portion of such salts, the proper amount of lime to be added in the practice of my process under ordinary conditions is approximately the same as the amount of the second factor above stated—namely, the amount that can be taken up by the raw water. This amount may be determined by adding the hydrate of lime to the raw water in various proportions and after the lapse of some hours testing for alkalinity. For this purpose nitrate of silver is used (in the absence of strong sunlight) as an indicator, and the amount of lime required to be added to the raw water to show a brown precipitate immediately upon the addition of nitrate of silver thereto after the lapse of several hours from the time when the lime was added is the amount of lime that reacts with the matter in the water, and this amount usually furnishes the proper proportion for use in municipal water-supply systems. In the case of the Mississippi river water at St. Louis the proper amount of lime will vary from four to eight grains per gallon of water, depending upon the conditions of the water.

A more rapid method of ascertaining the amount of lime that can be taken up by the raw water is as follows: To a measured quantity of water to be treated there is added a measured quantity of lime-water more than sufficient to react with the constituents of the water. After agitation for several minutes and settling until the water is moderately clear a measured volume is decanted and silver nitrate added thereto in excess of the quantity to combine with any chlorin in the water, whereby a brown precipitate of hydroxid of silver is formed. Decinormal sulfuric acid is then run in from the burette until the brown color disappears. This quantity of sulfuric acid measures the excess of lime added, and this amount of lime substracted from the total amount added gives the amount of lime the water will take up. This method must be carried on in the absence of strong sunlight, because if there is any chlorin in the raw water chlorid of silver will be formed and will quickly turn black in strong sunlight. This method of titration with decinormal sulfuric acid may be advantageously varied as follows: After adding the lime-water to the raw water and agitating and settling a measured volume of the treated water is filtered and a few drops of phenolphthalein added thereto to give it a red color. Decinormal sulfuric acid is then added from a burette until the red color disappears. The amount of decinormal sulfuric acid used measures the excess of lime in the sample, and this deducted from the total amount of lime originally added gives the amount of lime taken up by the water.

In order that the fluorid sulution may be uniformly distributed throughout the water, it is advisable to introduce it by means of a continuously-flowing stream of water. This stream is arranged to flow upwardly through a box or tank into which measured quantities of the metallic fluorid are placed at measured times, so that eventually the stream will dissolve in a given time an amount of the fluorid equal to that added during that time. It is also advisable to introduce the lime by means of a second stream of hot water arranged to run through tanks into which the lime is placed periodically and thoroughly stirred.

The reason for using hot water in treating the lime is that it is impracticable to slake lime in a running stream of cold water.

With the exception of the normal alkali fluorids any fluid or soluble fluorid—such, for instance, as the fluorids of manganese, copper, zinc, iron, or silicon, or the double fluorids, such as silicofluorid of iron—may be used in the practice of my process. For economical reasons, however, ferrous fluorid is preferable, as it may be readily manufactured by the action of hydrofluoric acid upon iron or its hydrates.

When the ferric fluorid is used instead of ferrous fluorid, the reaction with the dissolved bicarbonates of lime produces calcium fluorid and ferric hydrate which is the same coagulant that was indirectly produced in the case of the ferrous fluorid, as above explained.

The fluorids of copper, zinc, and manganese are also available for use, producing strong heavy coagulants and adding no new matter to the clarified water. Their reactions are similar to those above described.

All of the fluorids heretofore mentioned are soluble and are added to the raw water in the form of solutions. The fluorid of silicon may also be used. This fluorid is a gas that is not soluble in water, but is decomposed by it. When this fluorid (silicon tetrafluorid) is used, it decomposes and reacts with dissolved bicarbonates, forming insoluble calcium or magnesium fluorid and silicic hydrate. The silicic hydrate is a strong coagulant, which acts to a large extent like the hydrates of the other metals above stated. The fluorid of silicon may be introduced through a lead or aluminium pipe whose end is immersed in a mercury-bath below the surface of the water.

While the fluorids of the alkali elements may be used, they are not as satisfactory as those of the non-alkali elements, for the reason that the hydrates of the alkali elements are soluble and produce soluble compounds upon reaction with lime. Consequently such alkali fluorids not only fail to furnish a proper coagulation, but they leave in the water an ingredient that was not in the natural water. This objection applies in a much less degree to the double fluorids of the alkali and non-alkali elements, and such double fluorids may be used with economy. In case of such double fluorids the non-alkali element is the important agent in the process.

What I claim as my invention, and desire to secure by Letters Patent, is—

1. The process of purifying water which consists in treating the same with a fluorid in a form capable of reaction with dissolved carbonates and afterward but before sedimentation treating it with lime.

2. The process of purifying water which consists in adding thereto a fluorid in a fluid form and afterward adding lime, substantially as and for the purpose described.

3. The process of purifying water which consists in treating the same with a soluble fluorid, and afterward adding lime thereto and keeping the water in motion to prevent sedimentation while the lime reactions are occurring, and then permitting sedimentation.

4. The process of purifying water which consists in treating the same with a soluble fluorid of a non-alkali element, and afterward adding lime thereto and keeping the water in motion to prevent sedimentation while the lime reactions are occurring, and then permitting sedimentation.

5. The process of purifying water which consists in treating the same with a fluorid of iron, and afterward adding lime thereto and keeping the water in motion to prevent sedimentation while the lime reactions are occurring, and then permitting sedimentation.

6. The process of purifying water which consists in treating the same with ferrous fluorid and afterward adding lime thereto and keeping the water in motion to prevent sedimentation while the lime reactions are occurring, and then permitting sedimentation.

7. The process of purifying water which consists in treating the same with a soluble fluorid, then adding thereto hydrate of lime in excess of the quantity that would be required to satisfy such fluorid, preventing the precipitates from settling for a period of several minutes, and afterward permitting sedimentation.

8. The process of purifying water which consists in treating the same with a soluble fluorid of a non-alkali element, then adding thereto hydrate of lime in excess of the quantity that would be required to satisfy such fluorid, preventing the precipitates from settling for a period of several minutes, and afterward permitting sedimentation.

9. The process of purifying water which consists in treating the same with a soluble metallic fluorid, then adding thereto lime in approximately such proportion as would be necessary to make the natural water indicate caustic alkalinity if tested several hours after the addition of lime thereto, keeping the water in motion to prevent sedimentation during the lime reactions, and afterward permitting sedimentation.

10. The process of purifying water which consists in adding thereto a solution of a fluorid of a non-alkali element in the proportion required to produce a suitable coagulation, afterward adding hydrate of lime thereto in the proportion specified, agitating the water during the lime reactions, and afterward permitting sedimentation.

11. The process of purifying water which consists in adding ferrous fluorid thereto in the proportion of from one-quarter of a grain to two grains of anhydrous ferrous fluorid per gallon of water, and adding lime in the proportion of from four to eight grains per gallon of water.

12. The process of purifying water which consists in treating the same while in motion with a solution of a fluorid of a non-alkali element and afterward adding hydrate of lime to the moving water thus treated, and afterward reducing the rate of flow to permit sedimentation, the proportion of lime being approximately the same as that required to be added to the natural water to make it show caustic alkalinity when tested with silver nitrate a considerable time after the addition of lime.

13. The process of purifying water which consists in continuously directing into a stream thereof separate streams containing a fluorid of iron and hydrate of lime, respectively, and afterward permitting the water to settle, the hydrate of lime being added at a point in the stream beyond the point where the iron is added, substantially in the proportions and for the purpose described.

14. The process of purifying water which consists in keeping the same in motion and continuously adding thereto a fluorid of iron and hydrate of lime in substantially the proportions specified, the hydrate of lime being added at a point beyond the point of admission of the fluorid and in excess of the amount required to satisfy the free carbonic acid and the fluorid in the water, said reagents being added by means of streams of water running continuously through masses of the respective reagents to which measured quantities are added at intervals to secure uniformity of distribution.

15. The process of purifying water which consists in adding a solution of ferrous fluorid to a stream of water to be purified in the proportion of approximately one grain of anhydrous ferrous fluorid per gallon of water, and adding approximately six grains of lime per gallon in the form of hydrate of lime, and then permitting such water to settle, the hydrate of lime being added to such stream at a point beyond the point of admission to the ferrous fluorid.

16. The process of purifying water which consists in adding a solution of ferrous fluorid thereto while in motion in the proportion of approximately one grain of anhydrous ferrous fluorid and approximately six grains of lime per gallon, the ferrous fluorid being added before the lime by means of a stream of water flowing continuously through a mass of ferrous fluorid to which measured quantities are added at measured intervals.

17. The process of purifying water which consists in mixing therewith a solution of a fluorid of a non-alkali element and then mixing hydrate of lime therewith, keeping the water in agitation sufficient to prevent sedimentation of the precipitates for several minutes after the addition of lime, and then causing the water to well upwardly at slow velocity below the surface of the water in the settling-basin.

JOHN F. WIXFORD.

Witnesses:
 FRED F. REISNER,
 J. B. MEGOWN.